United States Patent
Day

(10) Patent No.: US 9,126,538 B1
(45) Date of Patent: Sep. 8, 2015

(54) VEHICLE INCLUDING COLLAPSIBLE CARGO CONTAINER

(71) Applicant: Toyota Motor Engineering & Manufacturing North America, Inc., Erlanger, KY (US)

(72) Inventor: Robert Day, Northfield Township, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 14/265,566

(22) Filed: Apr. 30, 2014

(51) Int. Cl.
*B60R 7/00* (2006.01)
*B60R 7/04* (2006.01)

(52) U.S. Cl.
CPC ..................................... *B60R 7/043* (2013.01)

(58) Field of Classification Search
CPC ......................................................... B60R 7/043
USPC .......................................... 296/37.15, 37.16
See application file for complete search history.

(56) References Cited

U.S. PATENT DOCUMENTS

| | | | |
|---|---|---|---|
| 3,165,247 A * | 1/1965 | Burns | 224/275 |
| 6,793,285 B1 | 9/2004 | Tame | |
| 6,981,730 B2 | 1/2006 | Bixby | |
| 8,657,356 B2 * | 2/2014 | Pywell et al. | 296/37.15 |
| 8,770,661 B2 * | 7/2014 | Kalergis et al. | 297/188.1 |
| 2005/0057081 A1 | 3/2005 | Kahn et al. | |
| 2008/0093874 A1 * | 4/2008 | Partch | 296/37.15 |
| 2009/0152888 A1 | 6/2009 | Zelmanov et al. | |
| 2011/0163582 A1 | 7/2011 | Nazione et al. | |
| 2012/0313394 A1 | 12/2012 | Barrow et al. | |

\* cited by examiner

*Primary Examiner* — Joseph D Pape
(74) *Attorney, Agent, or Firm* — Dinsmore & Shohl LLP

(57) ABSTRACT

Vehicles including collapsible cargo containers that collapse beneath tumble seats and methods of collapsing collapsible cargo containers beneath tumble seats are disclosed. A vehicle includes a vehicle floor, a tumble seat pivotably coupled to the vehicle floor, and a collapsible cargo container attached to the vehicle floor and attached to the tumble seat. The tumble seat is pivotable from a tumble-forward position to an upright seating position. When the tumble seat is pivoted from the tumble-forward position to the upright seating position, the collapsible cargo container collapses from a cargo storage configuration to a collapsed configuration beneath the tumble seat.

20 Claims, 5 Drawing Sheets

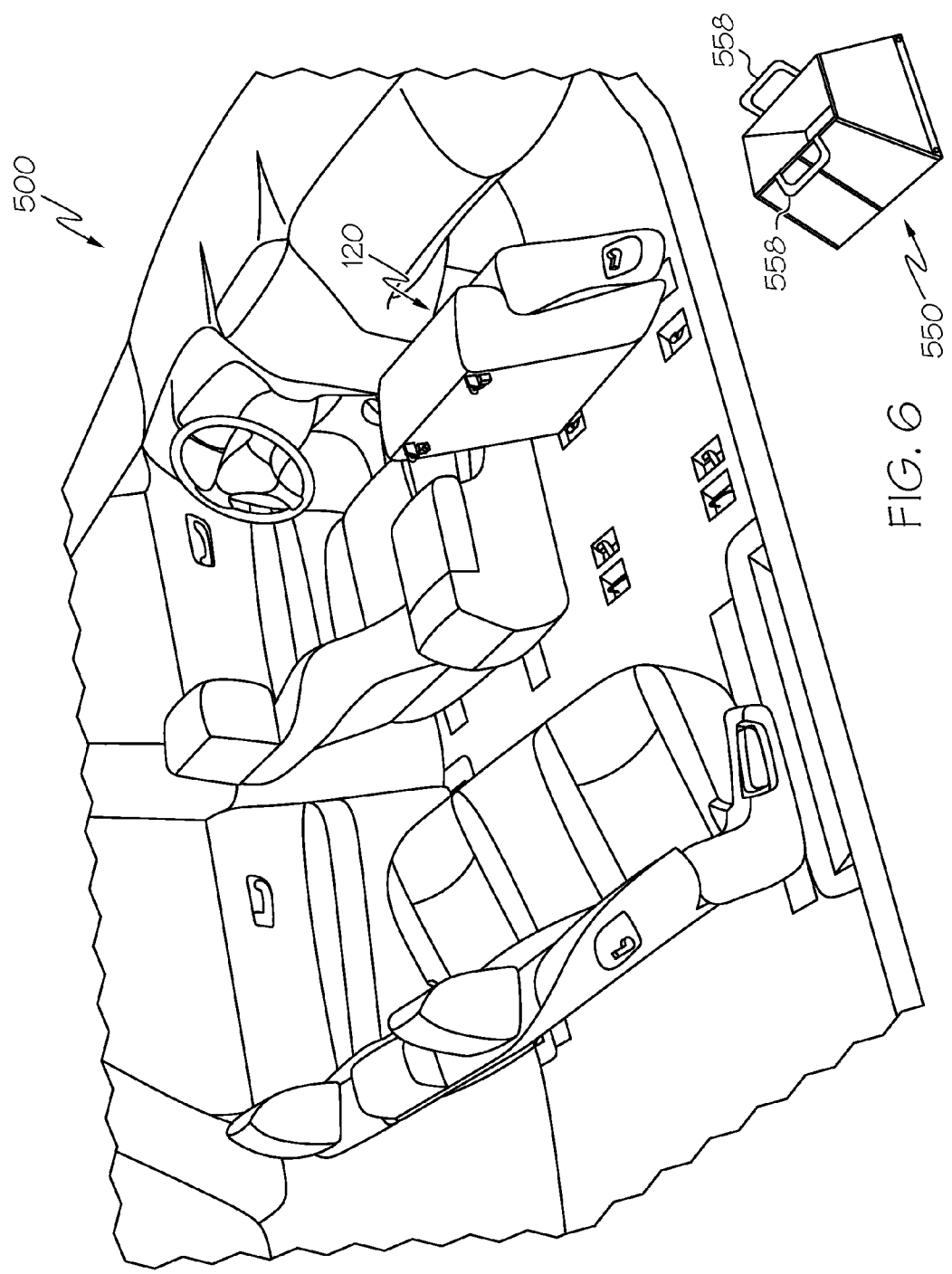

VEHICLE INCLUDING COLLAPSIBLE CARGO CONTAINER

TECHNICAL FIELD

Embodiments described herein generally relate to collapsible cargo containers and, more specifically, to vehicles including collapsible cargo containers and methods of collapsing collapsible cargo containers in vehicles.

BACKGROUND

By way of background, vehicles may be utilized to transport cargo. Such cargo may be stored in a cargo container positioned within a passenger cabin of the vehicle. However, it may be undesirable for cargo containers positioned within vehicles to occupy valuable vehicle space when the containers are not in use. Thus, it may be desirable to utilize cargo containers within vehicles that store the cargo in a space-efficient and convenient manner.

Accordingly, a need exists for vehicles including collapsible cargo containers.

SUMMARY

In one embodiment, a vehicle includes a vehicle floor, a tumble seat pivotably coupled to the vehicle floor, and a collapsible cargo container attached to the vehicle floor and attached to the tumble seat. The tumble seat is pivotable from a tumble-forward position to an upright seating position. When the tumble seat is pivoted from the tumble-forward position to the upright seating position, the collapsible cargo container collapses from a cargo storage configuration to a collapsed configuration beneath the tumble seat.

In another embodiment, a vehicle includes a vehicle floor, a tumble seat pivotably coupled to the vehicle floor, a collapsible cargo container, a seat attachment member coupled to the collapsible cargo container, a floor attachment member coupled to the collapsible cargo container, a seat attachment anchor coupled to a seat base of the tumble seat and attached to the seat attachment member, and a floor attachment anchor coupled to the vehicle floor and attached to the floor attachment member. The tumble seat is pivotable from a tumble-forward position to an upright seating position. The seat attachment member attaches the collapsible cargo container to the tumble seat. The floor attachment member attaches the collapsible cargo container to the vehicle floor. When the tumble seat is pivoted from the tumble-forward position to the upright seating position, the collapsible cargo container collapses from a cargo storage configuration to a collapsed configuration beneath the tumble seat.

In yet another embodiment, a method of collapsing a collapsible cargo container from a cargo storage configuration to a collapsed configuration beneath a tumble seat includes attaching the collapsible cargo container to a vehicle floor, attaching the collapsible cargo container to the tumble seat, and pivoting the tumble seat from a tumble-forward position to an upright seating position, thereby collapsing the collapsible cargo container from the cargo storage configuration to the collapsed configuration beneath the tumble seat. The tumble seat is pivotably coupled to the vehicle floor.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 6 schematically depicts a perspective view of an interior portion of a vehicle with a detached collapsible cargo container, according to one or more embodiments shown and described herein.

DETAILED DESCRIPTION

The embodiments disclosed herein include vehicles including collapsible cargo containers and methods of collapsing collapsible cargo containers in vehicles. Referring generally to the figures, a vehicle includes a vehicle floor, a tumble seat, and a collapsible cargo container attached to the vehicle floor and attached to the tumble seat. The tumble seat is pivotably coupled to the vehicle floor and is pivotable from a tumble-forward position to an upright seating position. When the tumble seat is pivoted from the tumble-forward position to the upright seating position, the collapsible cargo container collapses from a cargo storage configuration to a collapsed configuration beneath the tumble seat. The collapsible cargo containers described herein enhance vehicle cargo capacity when a tumble seat is not needed by utilizing unused floor space for storage when the seat is in the tumble-forward position. The collapsible cargo containers described herein reduce required storage space of the cargo container when the tumble seat is in use by allowing the cargo container to be stored under the seat. The various vehicles including collapsible cargo containers and methods of collapsing collapsible cargo containers in vehicles will be described in more detail herein with specific reference to the corresponding drawings.

Figure 1:
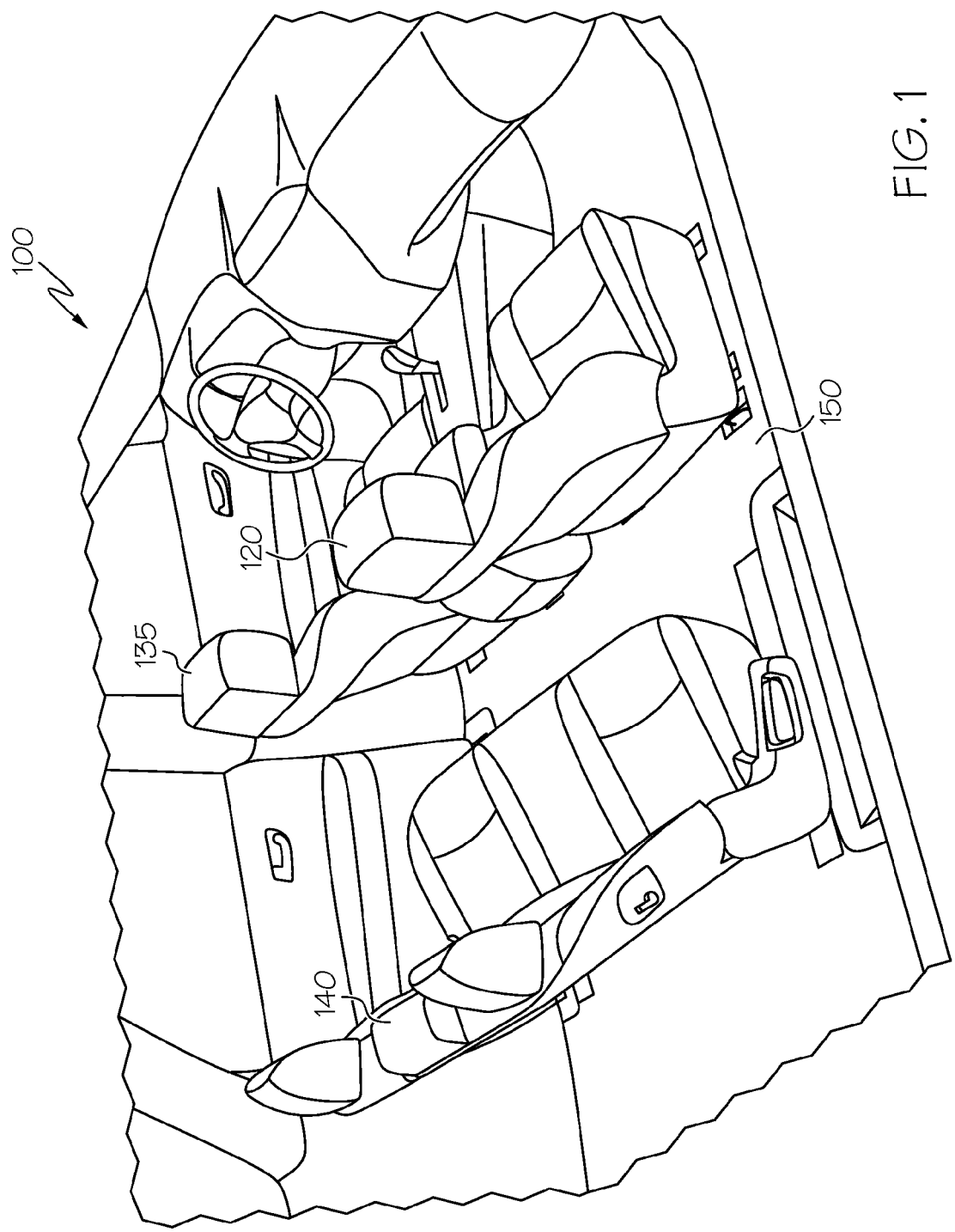
FIG. 1 schematically depicts a perspective view of an interior portion of a vehicle including a tumble seat, according to one or more embodiments shown and described herein.

Referring now to the drawings, FIG. 1 schematically depicts an interior of a vehicle 100, according to embodiments described herein. The vehicle 100 includes a tumble seat 120 pivotably coupled to a vehicle floor 150. A passenger may sit in the tumble seat 120 when the tumble seat 120 is in an upright seating position, as depicted in FIG. 1. The tumble seat 120 may be pivoted to a tumble-forward position to open up a collapsible cargo container, as will be described in detail below. While the embodiments described herein depict the tumble seat 120 as the passenger seat of the vehicle 100, it should be understood that in other embodiments the tumble seat 120 may be a driver seat 135, a middle seat 140, a rear seat, or another vehicle seat.

Figure 2:
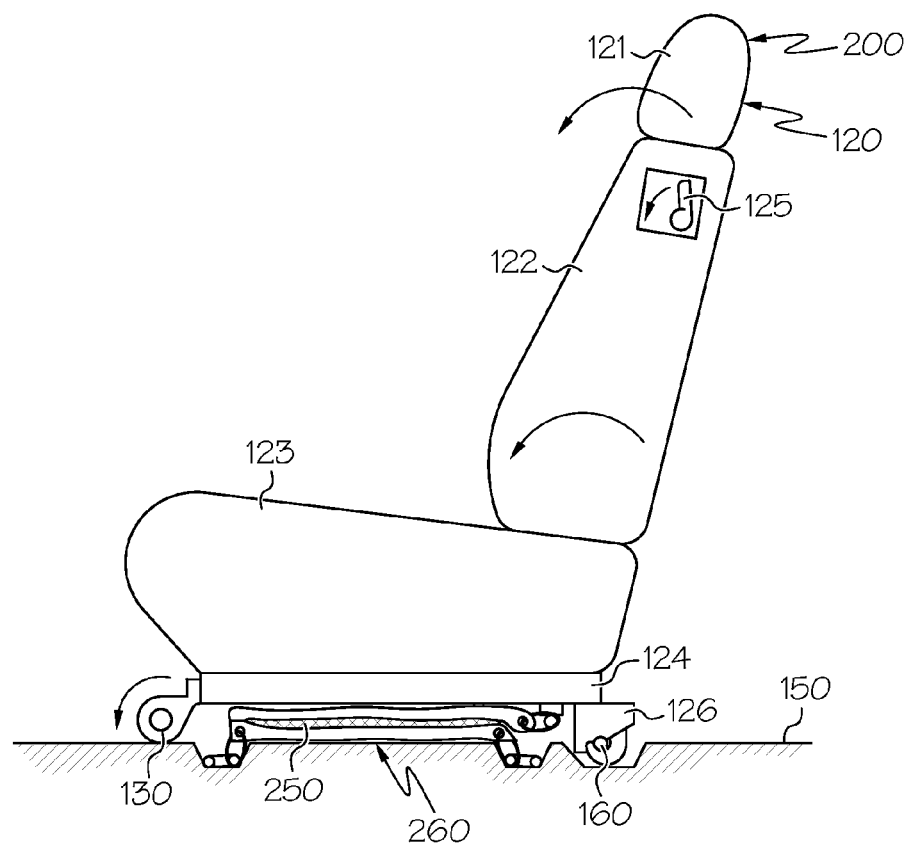
FIG. 2 schematically depicts a side view of a collapsible cargo container in a collapsed configuration beneath a tumble seat in an upright seating position, according to one or more embodiments shown and described herein.

Referring now to FIG. 2, a side view of the tumble seat 120 of FIG. 1 is schematically depicted in an upright seating position 200 in which a person may sit in the tumble seat 120. The tumble seat 120 includes a headrest 121, a seat back 122, a seat cushion 123, a seat base 124, a quick release lever 125, and a release latch 126. The headrest 121 is coupled to the seat back 122. The seat back 122 is coupled to the seat cushion 123. The seat cushion 123 is coupled to the seat base 124. The quick release lever 125 is coupled to the seat back 122 and is operable, when actuated, to pivot the tumble seat 120 from the upright seating position 200 to a tumble-forward position, as described in detail below. The release latch 126 is coupled to the seat base 124 and engages a seat latch striker 160 coupled to the vehicle floor 150 to secure the tumble seat 120 to the vehicle floor 150 when the tumble seat 120 is in the upright seating position 200.

As depicted in FIG. 2, a collapsible cargo container 250 is stored beneath the tumble seat 120 (i.e., between the tumble seat 120 and the vehicle floor 150) in a collapsed configuration 260. By storing the collapsible cargo container 250 beneath the tumble seat 120 in a collapsed configuration 260 when the tumble seat 120 is in the upright seating position 200, the space required to store the collapsible cargo container 250 is minimized when the collapsible cargo container 250 is not in use.

Figure 3:
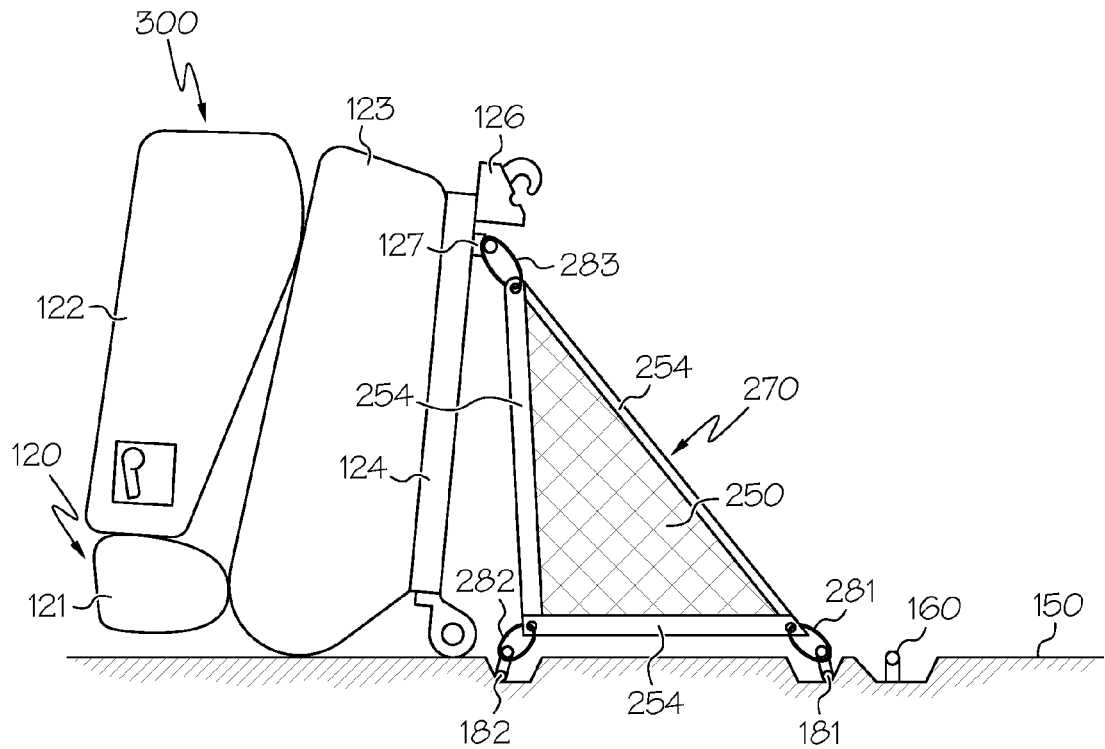
FIG. 3 schematically depicts a side view of a collapsible cargo container in a cargo storage configuration when a tumble seat is in a tumble-forward position, according to one or more embodiments shown and described herein.

Referring now to FIG. 3, a side view of the tumble seat 120 of FIG. 1 is schematically depicted in a tumble-forward position 300. The collapsible cargo container 250 is in a cargo storage configuration 270 in which cargo may be readily inserted into and retained by the collapsible cargo container 250. The collapsible cargo container 250 includes a plurality of support strips 254 that provide support and shape to the collapsible cargo container 250. In some embodiments, the plurality of support strips 254 may be plastic strips with designed folding points that facilitate the expansion of the collapsible cargo container from the collapsed configuration 260 (see FIG. 2) to the cargo storage configuration 270 depicted in FIG. 3 so that the collapsible cargo container 250 has a desired shape in the cargo storage configuration 270. When the plurality of support strips 254 are plastic strips with designed folding points, the plurality of support strips 254 may also facilitate the controlled collapsing of the collapsible cargo container 250 from the cargo storage configuration 270 to the collapsed configuration 260 so that the collapsible cargo container 250 does not interfere with the pivoting of the tumble seat 120 from the tumble-forward position 300 to the upright seating position 200 (e.g., by not interfering with the engagement of the release latch 126 and the seat latch striker 160). In some embodiments, the plurality of support strips 254 may not include designed folding points. In some embodiments, the plurality of support strips 254 may be formed from a material other than plastic, such as a resilient metal or a resilient composite material. It should be understood that some embodiments of the collapsible cargo container 250 do not include a plurality of support strips 254.

Figure 4:
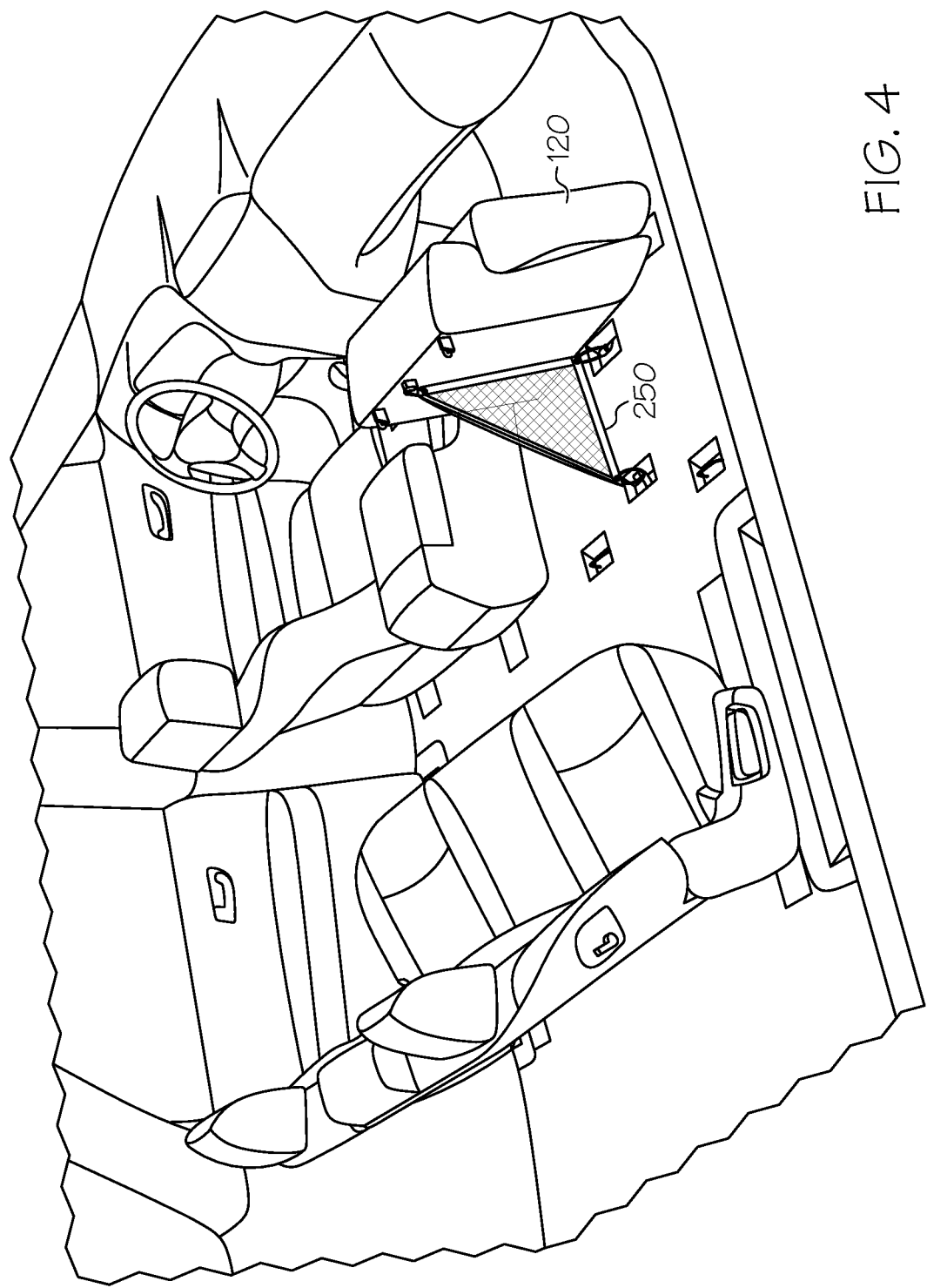
FIG. 4 schematically depicts a perspective view of an interior portion of a vehicle including the collapsible cargo container of FIG. 3, according to one or more embodiments shown and described herein.

Still referring to FIG. 3, the collapsible cargo container 250 includes a mesh net, such as a mesh net formed from nylon or another synthetic material. In some embodiments, the collapsible cargo container 250 is an envelope mesh net (such as depicted in FIG. 4). As shown in FIG. 4, the envelope mesh net includes two opposing layers of mesh net, which may be pulled apart so that cargo may be stored within an envelope defined by the opposing layers of mesh net. In some embodiments (e.g., the embodiment depicted in FIG. 5 and described below), the collapsible cargo container 250 may not be a mesh net, such as when the collapsible cargo container 250 is formed from a solid fabric (e.g., canvas or nylon), a flexible plastic, or any other material.

Referring once again to FIG. 3, the collapsible cargo container 250 is attached to the tumble seat 120 by a seat attachment anchor 127 coupled to the seat base 124. Specifically, a seat attachment member 283 coupled to the collapsible cargo container 250 attaches the collapsible cargo container 250 to the seat attachment anchor 127. In some embodiments, the seat attachment member 283 removably attaches the collapsible cargo container 250 to the seat attachment anchor 127, such as when the seat attachment member 283 is a quick release clip, a quick release ring, a cord or ring including a quick release clip, or the like. By removably attaching the collapsible cargo container 250 to the seat attachment anchor 127, the collapsible cargo container 250 may be detached from the tumble seat 120 for use outside the vehicle or may be detached from the tumble seat 120 so that the area proximate the collapsible cargo container 250 may be cleaned. Some embodiments may not include a seat attachment anchor 127, such as in embodiments in which the collapsible cargo container 250 is coupled to another component of the tumble seat 120. Some embodiments do not include the seat attachment member 283, such as in embodiments in which the collapsible cargo container 250 is directly attached to the seat attachment anchor 127. Furthermore, while the embodiment depicted in FIG. 3 depicts one seat attachment anchor 127 and one seat attachment member 283, it should be understood that other embodiments may include more than one seat attachment anchor, more than one seat attachment member, or both more than one seat attachment anchor and more than one seat attachment member.

Still referring to FIG. 3, the collapsible cargo container 250 is attached to the vehicle floor 150 by a first floor attachment anchor 181 and a second floor attachment anchor 182. The first floor attachment anchor 181 and the second floor attachment anchor 182 are coupled to the vehicle floor 150. A first floor attachment member 281 coupled to the collapsible cargo container 250 attaches the collapsible cargo container 250 to the first floor attachment anchor 181. A second floor attachment member 282 coupled to the collapsible cargo container 250 attaches the collapsible cargo container 250 to the second floor attachment anchor 182. In some embodiments, the first floor attachment member 281 and the second floor attachment member 282 removably attach the collapsible cargo container 250 to the first floor attachment anchor 181 and the second floor attachment anchor 182, respectively, such as when the first floor attachment member 281 and the second floor attachment member 282 are quick release clips, quick release rings, cords or rings including a quick release clips, or the like. By removably attaching the collapsible cargo container 250 to the floor attachment anchors, the collapsible cargo container 250 may be detached from the vehicle floor 150 for use outside the vehicle or may be detached from the vehicle floor 150 so that the area proximate the collapsible cargo container 250 may be cleaned. Some embodiments may not include one or both of the first floor attachment anchor 181 and the second floor attachment anchor 182, such as in embodiments in which the collapsible cargo container 250 is coupled to another component of the vehicle floor 150. Some embodiments do not include one or both of the first floor attachment member 281 and the second floor attachment member 282, such as in embodiments in which the collapsible cargo container 250 is directly attached to the first floor attachment anchor 181 and the second floor attachment anchor 182. Furthermore, while the embodiment depicted in FIG. 3 depicts two floor attachment anchors and two floor attachment members, it should be understood that other embodiments may include one floor attachment anchor and floor attachment member, three or more floor attachment anchors and floor attachment members, or a mismatched number of floor attachment anchors and floor attachment members.

Referring once again to FIGS. 2 and 3, the tumble seat 120 may be pivoted from the upright seating position 200 (FIG. 2) to the tumble-forward position 300 (FIG. 3) in order to deploy the collapsible cargo container 250 from the collapsed configuration 260 (FIG. 2) to the cargo storage configuration (FIG. 3). The tumble seat 120 may be pivoted to the tumble-forward position 300 by actuating the quick release lever 125, thereby causing the release latch 126 to disengage from the seat latch striker 160, allowing the tumble seat 120 to be pivoted about a pivot point 130. When the tumble seat 120 transitions from the upright seating position 200 to the tumble-forward position 300, the headrest 121 rotates relative to the seat back 122, the seat back 122 rotates relative to the seat cushion 123, and the seat cushion 123 and seat base 124 rotate relative to the vehicle floor 150, as indicated by the arrows in FIG. 2. In some embodiments, the pivot point 130 includes a torsion spring that helps guide the tumble seat 120 from the upright seating position 200 to the tumble-forward position when the quick release lever 125 is actuated.

Still referring to FIGS. 2 and 3, the tumble seat 120 may be pivoted from the tumble-forward position 300 (FIG. 3) to the upright seating position 200 (FIG. 2) in order to collapse the collapsible cargo container 250 from the cargo storage configuration 270 (FIG. 3) to the collapsed configuration 260 (FIG. 2). Force may be applied to the tumble seat 120 to pivot the tumble seat 120 about the pivot point 130, causing the headrest 121 to rotate relative to the seat back 122, the seat back 122 to rotate relative to the seat cushion 123, and the seat cushion 123 and seat base 124 to rotate relative to the vehicle floor 150 so that the headrest 121, the seat back 122, the seat cushion 123, and the seat base 124 return to the configuration depicted in FIG. 2. The release latch 126 engages the seat latch striker 160 to secure the tumble seat 120 to the vehicle floor 150 when the tumble seat 120 reaches the upright seating position 200.

Figure 5:
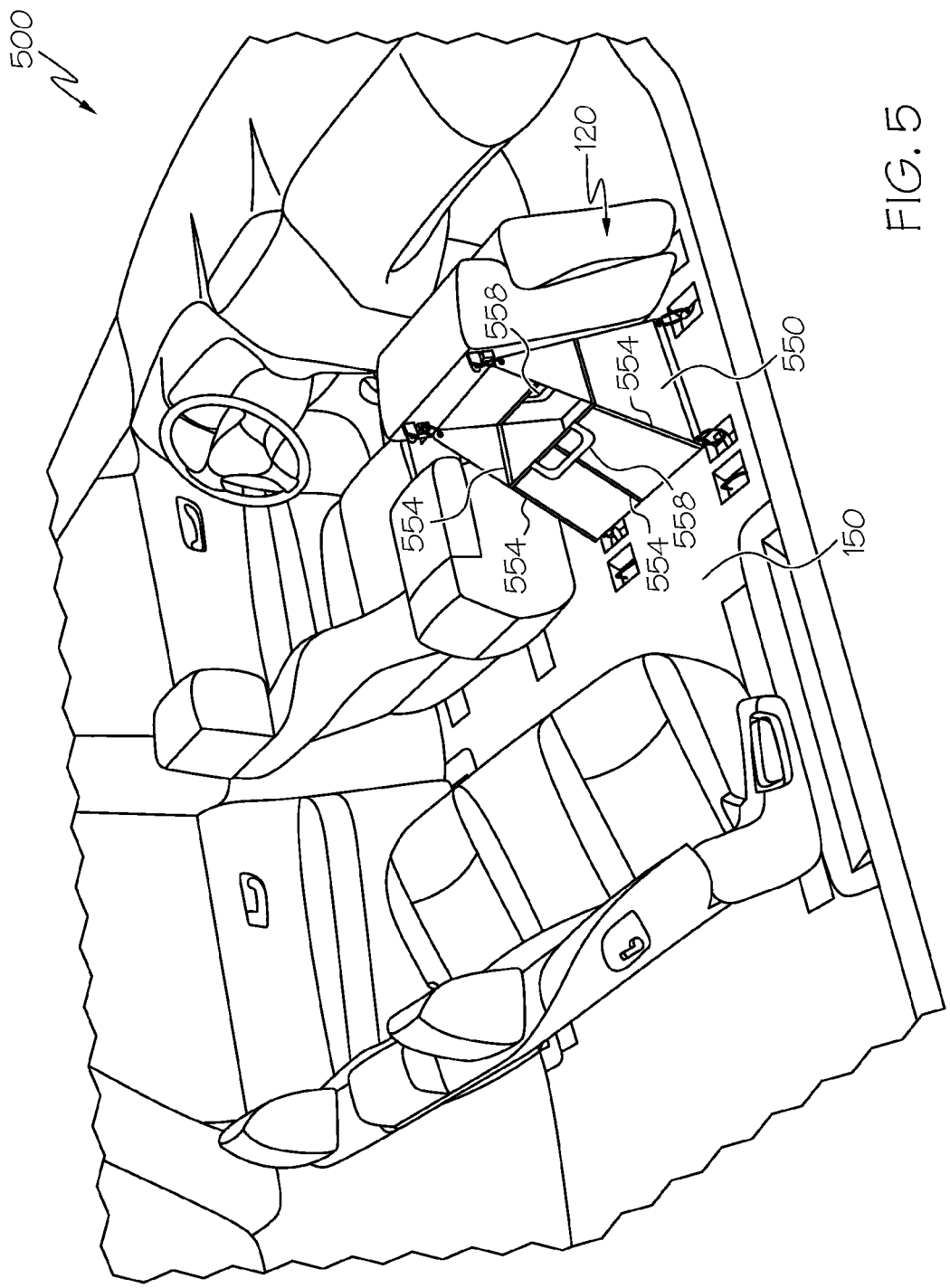
FIG. 5 schematically depicts a perspective view of an interior portion of a vehicle including a collapsible cargo container in a cargo storage configuration when a tumble seat is in a tumble-forward position, according to one or more embodiments shown and described herein.

Referring now to FIG. 5, a perspective view of an interior portion of a vehicle 500 including another embodiment of a collapsible cargo container 550 in a cargo storage configuration is schematically depicted when a tumble seat 120 is in a tumble-forward position. The collapsible cargo container 550 includes a plurality of support strips 554 and a plurality of handles 558. The plurality of support strips 554 provide support and shape to the collapsible cargo container 550. The plurality of support strips 554 may facilitate the expansion of the collapsible cargo container 550 from a collapsed configuration to a cargo storage configuration so that the collapsible cargo container 550 has a desired shape in the cargo storage configuration, and may facilitate the controlled collapsing of the collapsible cargo container 550 from the cargo storage configuration to the collapsed configuration so that the collapsible cargo container does not interfere with the pivoting of the tumble seat 120 from the tumble-forward position to the upright seating position. In some embodiments, the collapsible cargo container 550 does not include the plurality of support strips 554. The plurality of handles 558 facilitate the carrying of the collapsible cargo container 550 when the collapsible cargo container 550 is detached from the tumble seat 120 and from the vehicle floor 150, as depicted in FIG. 6. While the embodiment depicted in FIGS. 5-6 includes two handles 558, other embodiments may include only one handle, more than two handles, or no handles at all.

By way of non-limiting example of the benefit of the collapsible cargo container 550, the collapsible cargo container 550 may enhance the convenience of a grocery shopping trip. When the grocery store is reached, the tumble seat 120 may be pivoted to the tumble-forward position to expand the collapsible cargo container 550 into the cargo storage configuration depicted in FIG. 5. The collapsible cargo container 550 may then be detached from the tumble seat 120 and from the vehicle floor 150. The collapsible cargo container 550 may then be carried outside of the vehicle and into a grocery store. Grocery items may be placed in the collapsible cargo container 550. The collapsible cargo container 550 may be returned to the vehicle 500 and reattached to the tumble seat 120 and the vehicle floor 150 (or simply stowed in another portion of the vehicle 100). The collapsible cargo container 550 may be again removed from the vehicle interior when groceries are brought to a user's home. The collapsible cargo container 550 may then be reattached to the tumble seat 120 and to the vehicle floor 150 for future use.

A method of collapsing the collapsible cargo containers described herein from a cargo storage configuration to a collapsed configuration beneath a tumble seat may include attaching the collapsible cargo container to the vehicle floor, attaching the collapsible cargo container to the tumble seat, and proving the tumble seat from a tumble-forward position to an upright seating position, thereby collapsing the collapsible cargo container from the cargo storage configuration to the collapsed configuration beneath the tumble seat. The collapsible cargo container may be attached to the tumble seat in any of the ways described above. The collapsible cargo container may be attached to the vehicle floor in any of the ways described above.

Thus, embodiments described herein provide for vehicles including collapsible cargo containers and methods of collapsing collapsible cargo containers in vehicles. The collapsible cargo containers described herein collapse from a cargo storage configuration to a collapsed configuration beneath a tumble seat when the tumble seat is pivoted from a tumble-forward position to an upright seating position, thereby enhancing vehicle cargo capacity when the tumble seat is not needed and reducing the required storage space of the cargo container when the tumble seat is in use.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a vehicle floor;
   a tumble seat pivotably coupled to the vehicle floor, wherein the tumble seat is pivotable from a tumble-forward position to an upright seating position; and
   a collapsible cargo container attached to the vehicle floor and attached to the tumble seat, wherein when the tumble seat is pivoted from the tumble-forward position to the upright seating position, the collapsible cargo container collapses from a cargo storage configuration to a collapsed configuration beneath the tumble seat.

2. The vehicle of claim 1, further comprising a seat attachment anchor coupled to a seat base of the tumble seat, wherein the collapsible cargo container is attached to the seat attachment anchor.

3. The vehicle of claim 1, further comprising a floor attachment anchor coupled to the vehicle floor, wherein the collapsible cargo container is attached to the floor attachment anchor.

4. The vehicle of claim 1, further comprising an attachment member coupled to the collapsible cargo container, wherein the attachment member attaches the collapsible cargo container to at least one of the tumble seat and the vehicle floor.

5. The vehicle of claim 1, further comprising a seat attachment member and a floor attachment member, wherein:
   the seat attachment member and the floor attachment member are coupled to the collapsible cargo container;
   the seat attachment member removably attaches the collapsible cargo container to the tumble seat;
   the floor attachment member removably attaches the collapsible cargo container to the vehicle floor; and
   the collapsible cargo container may be detached from the tumble seat and from the vehicle floor.

6. The vehicle of claim 1, wherein the collapsible cargo container comprises a mesh net.

7. The vehicle of claim 6, wherein the mesh net is an envelope mesh net.

8. The vehicle of claim 6, the collapsible cargo container further comprising a plurality of support strips.

9. The vehicle of claim 1, wherein the collapsible cargo container includes at least one handle.

10. A vehicle comprising:
    a vehicle floor;
    a tumble seat pivotably coupled to the vehicle floor, wherein the tumble seat is pivotable from a tumble-forward position to an upright seating position;
    a collapsible cargo container;
    a seat attachment member coupled to the collapsible cargo container;
    a floor attachment member coupled to the collapsible cargo container;
    a seat attachment anchor coupled to a seat base of the tumble seat and attached to the seat attachment member, thereby attaching the collapsible cargo container to the tumble seat;
    a floor attachment anchor coupled to the vehicle floor and attached to the floor attachment member, thereby attaching the collapsible cargo container to the vehicle floor, wherein
    when the tumble seat is pivoted from the tumble-forward position to the upright seating position, the collapsible cargo container collapses from a cargo storage configuration to a collapsed configuration beneath the tumble seat.

11. The vehicle of claim 10, wherein the collapsible cargo container comprises a mesh net.

12. The vehicle of claim 11, wherein the mesh net is an envelope mesh net.

13. The vehicle of claim 11, the collapsible cargo container further comprising a plurality of support strips.

14. The vehicle of claim 10, wherein the collapsible cargo container includes at least one handle.

15. A method of collapsing a collapsible cargo container from a cargo storage configuration to a collapsed configuration beneath a tumble seat, the method comprising:
    attaching the collapsible cargo container to a vehicle floor;
    attaching the collapsible cargo container to the tumble seat, wherein the tumble seat is pivotably coupled to the vehicle floor; and
    pivoting the tumble seat from a tumble-forward position to an upright seating position, thereby collapsing the collapsible cargo container from the cargo storage configuration to the collapsed configuration beneath the tumble seat.

16. The method of claim 15, wherein the collapsible cargo container is attached to the tumble seat by a seat attachment anchor coupled to a seat base of the tumble seat.

17. The method of claim 15, wherein the collapsible cargo container is attached to the vehicle floor by a floor attachment anchor coupled to the vehicle floor.

18. The method of claim 15, wherein the collapsible cargo container is attached to the tumble seat by a seat attachment member coupled to the collapsible cargo container.

19. The method of claim 15, wherein the collapsible cargo container is attached to the vehicle floor by a floor attachment member coupled to the collapsible cargo container.

20. The method of claim 15, wherein the collapsible cargo container comprises a mesh net.

\* \* \* \* \*

UNITED STATES PATENT AND TRADEMARK OFFICE
CERTIFICATE OF CORRECTION

PATENT NO. : 9,126,538 B1  
APPLICATION NO. : 14/265566  
DATED : September 8, 2015  
INVENTOR(S) : Robert Day It is certified that error appears in the above-identified patent and that said Letters Patent is hereby corrected as shown below:

Title Page, Item (54), and in the Specification, Column 1, Line 1,
delete "VEHICLE INCLUDING COLLAPSIBLE CARGO CONTAINER" and insert
-- VEHICLES INCLUDING COLLAPSIBLE CARGO CONTAINERS AND METHODS OF COLLAPSING COLLAPSIBLE CARGO CONTAINERS IN VEHICLES --, therefor.

Signed and Sealed this
Fifth Day of July, 2016

Michelle K. Lee
*Director of the United States Patent and Trademark Office*